US012183997B2

(12) United States Patent
Mao et al.

(10) Patent No.: US 12,183,997 B2
(45) Date of Patent: Dec. 31, 2024

(54) MXN MILLIMETER WAVE AND TERAHERTZ PLANAR DIPOLE END-FIRE ARRAY ANTENNA

(71) Applicant: Zhejiang Normal University, Jinhua (CN)

(72) Inventors: Yanfei Mao, Jinhua (CN); Chungeng Zhu, Jinhua (CN); Junwu Kan, Jinhua (CN); Shuyun Wang, Jinhua (CN); Shiju E, Jinhua (CN); Zhonghua Zhang, Jinhua (CN); Zhen Chai, Jinhua (CN); Annan Zhou, Jinhua (CN); Yaxin Deng, Jinhua (CN); Ruonan Na, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 113 days.

(21) Appl. No.: 18/065,341

(22) Filed: Dec. 13, 2022

(65) Prior Publication Data

US 2023/0187835 A1 Jun. 15, 2023

(30) Foreign Application Priority Data

Dec. 14, 2021 (CN) ............................ 202123139169

(51) Int. Cl.
*H01Q 9/06* (2006.01)
*H01Q 21/06* (2006.01)

(52) U.S. Cl.
CPC ........... *H01Q 9/065* (2013.01); *H01Q 21/062* (2013.01)

(58) Field of Classification Search
CPC ... H01Q 9/065; H01Q 21/062; H01Q 21/0075
See application file for complete search history.

(56) References Cited

FOREIGN PATENT DOCUMENTS

JP 2011228572 A * 11/2011

OTHER PUBLICATIONS

K.-Q. Huang and M. Swaminathan, "Antennas in Glass Interposer For sub-THz Applications," 2021 IEEE 71st Electronic Components and Technology Conference (ECTC), San Diego, CA, USA, Aug. 10, 2021, pp. 1150-1155. (Year: 2021).*

* cited by examiner

*Primary Examiner* — Dieu Hien T Duong
(74) *Attorney, Agent, or Firm* — SALIWANCHIK, LLOYD & EISENSCHENK

(57) ABSTRACT

The present disclosure belongs to the field of radio frequency circuit design, and in particular relates to a M×N millimeter wave and terahertz planar dipole end-fire array antenna. The M×N millimeter wave and terahertz planar dipole end-fire array antenna is composed of M paths of N× end-fire linear array antennas arranged at equal intervals, and the distance d between two adjacent N× end-fire linear array antennas is less than λ, where λ is the wavelength, and both M and N are integers greater than 1. By connecting linear type feed networks of the M paths of N× end-fire linear array antennas to M-path in-phase radio frequency signal transmitter and controlling the distance between two adjacent N× end-fire linear array antennas to be less than the effective wavelength, a higher gain and a higher half-power width can be realized, and the power consumption of the transmitter can be reduced.

7 Claims, 5 Drawing Sheets

MXN MILLIMETER WAVE AND TERAHERTZ PLANAR DIPOLE END-FIRE ARRAY ANTENNA

CROSS-REFERENCE TO RELATED APPLICATION

This patent application claims the benefit of Chinese Application No. 202123139169.X, filed on Dec. 14, 2021, the disclosure of which is incorporated by reference herein in its entirety.

TECHNICAL FIELD

The present disclosure belongs to the field of radio frequency circuit design, and in particular relates to a M×N millimeter wave and terahertz planar dipole end-fire array antenna.

BACKGROUND

For millimeter wave and terahertz transmitter systems, the difficulty and focus of the research is how to increase the output power of the transmitters.

In order to improve the output power, the commonly used transmitter array systems include phased array transmitter, spatial power-combining linear array transmitter and spatial power-combining planar array transmitter. The planar spatial power-combining linear array transmitters are generally realized by exciting antenna arrays with uniform phase change, and the transmitter structure is relatively simple, while in the phased array, the radio frequency signal of any phase is generally realized by the phase modulator in the transmitter, thus achieving the spatial angle control of the beam, and the transmitter structure is relatively complex.

In the existing millimeter wave and terahertz transmitter chip systems, the antenna gain is usually improved by using broadside arrays, thus improving the equivalent omnidirectional radiation power (EIRP) of the transmitters. However, the output power is still limited, off-chip silicon-based lens and dielectric lens are generally designed to focus millimeter waves and terahertz waves, thus further improving the equivalent omnidirectional radiation power (EIRP).

Compared with the broadside array, the main lobe of the antenna array of the end-fire array antenna points in the direction of the array axis at the maximum, which has higher directional coefficient and higher beam width. How to combine the advantages of the end-fire array antenna to improve the antenna array gain and the beam width of the millimeter wave and terahertz transmitter system so as to further improve the equivalent omnidirectional output power (EIRP) of the transmitter and reduce the physical alignment accuracy requirement between the transmitter and the receiver is a technical problem to be solved urgently in this field.

SUMMARY

In order to improve an antenna array gain and a beam width of a transmitter system, the present disclosure provides a M×N millimeter wave and terahertz planar dipole end-fire array antenna. The antenna structure reduces the physical alignment accuracy requirement between a transmitter and a receiver, and has lower transmitter power consumption, thus being suitable for millimeter wave and terahertz transmitter array system with high energy efficiency, high output power and low power consumption requirements.

The present disclosure employs the following technical solution:

A M×N millimeter wave and terahertz planar dipole end-fire array antenna consists of M paths of N× end-fire linear array antennas arranged at equal intervals. The distance d between two adjacent N× end-fire linear array antennas is less than λ, wherein λ, is the wavelength, and both M and N are integers greater than 1.

Each of the N× end-fire linear array antennas is of a planar structure, and comprises a linear type feed network, and N dipole antenna elements constituting the N× end-fire array antenna. The linear type feed networks in the M paths of N× end-fire linear array antennas are connected to a M-path in-phase radio frequency signal transmitter.

As a preference of the present disclosure, the antenna element is a dipole antenna. A helical antenna or a patch antenna may also be used as the antenna element of N× end-fire array antenna.

As a preference of the present disclosure, one end of the linear type feed network is connected to the M-path in-phase radio frequency signal transmitter via matched micro-strip lines or coplanar waveguides.

As a preference of the present disclosure, the linear type feed network comprises an upper feed network and a lower feed network. The upper feed network is etched on the top metal surface of the double metal surface, and the lower feed network is etched on the bottom metal surface on the other side of the double metal surface. Different sides of the upper feed network and the lower feed network in each linear type feed network are etched with uniformly arranged antenna elements.

As a preference of the present disclosure, the antenna elements etched on the same metal surface of the double metal surface are towards the same side.

As a preference of the present disclosure, the number of the antenna elements connected to the same upper feed network or the same lower feed network is 3 to 20, and the distance Δd between the two adjacent antenna elements is equal to λ(2k). The distance Δd may be fine-tuned up or down from λ/(2k), where k is an integer greater than zero.

As a preference of the present disclosure, the number M of the N× end-fire linear array antennas is equal to 2 to 100.

Compared with the existing planar end-fire array antenna, the end-fire planar dipole array antenna provided by the present disclosure is fabricated by M paths of N× end-fire linear array antennas by planar process, which has a simple structure. By connecting linear type feed networks of the M paths of N× end-fire linear array antennas to the M-path in-phase radio frequency signal transmitter and controlling the distance between two adjacent N× end-fire linear array antennas to be less than the effective wavelength, a higher gain and a higher half-power width can be realized, and the power consumption of the transmitter can be reduced. Therefore, the array antenna is suitable for a millimeter wave and terahertz transmitter array system with high energy efficiency, high output power, and low power consumption requirements.

DETAILED DESCRIPTION OF THE EMBODIMENTS

The present disclosure is further explained and described below with reference to the accompanying drawings and embodiments.

Figure 1:
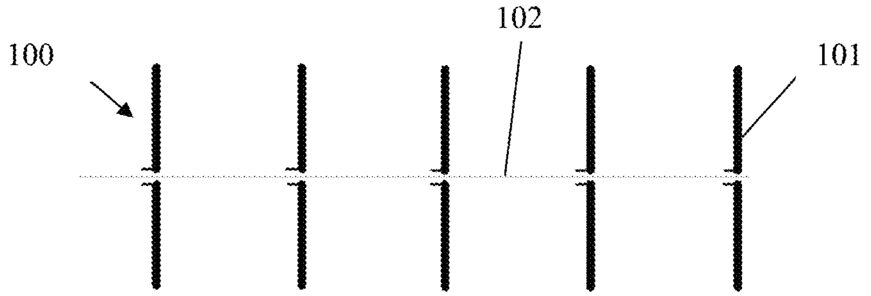
FIG. 1 is a schematic diagram of a planar process-based N×(N=5) half-wave dipole end-fire linear array antenna.
Figure 2:
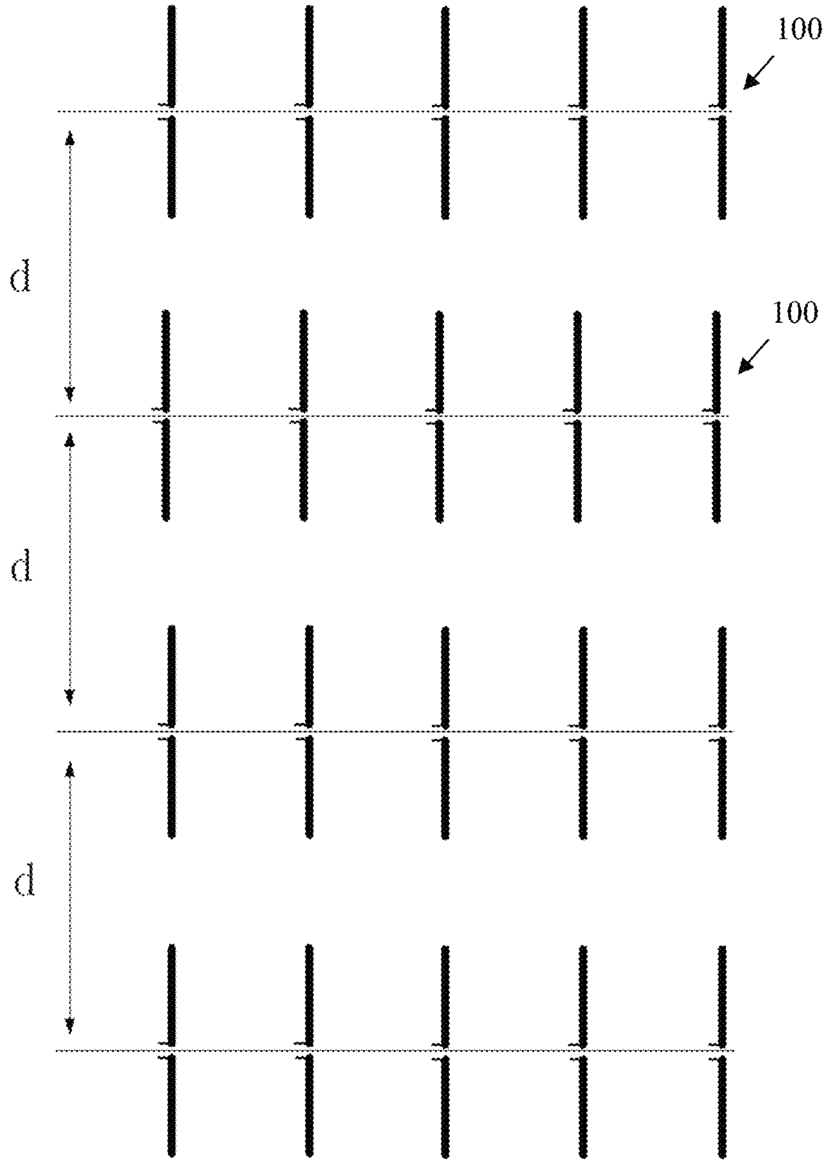
FIG. 2 is a schematic diagram of a 4×5 millimeter wave and terahertz planar dipole end-fire array antenna constructed when the number of the array elements is that M=4 and N=5.

A M×N millimeter wave and terahertz planar dipole end-fire array antenna provided by the present disclosure is achieved by using a planar process, such as a PCB (printed circuit board) process, SiGe BiCMOS (bipolar complementary metal oxide semiconductor) process, and a CMOS (complementary metal oxide semiconductor) process. At first, a N× end-fire linear array antenna suitable for the planar process is designed, as shown in FIG. 1. An antenna element 101 of the N× end-fire linear array antenna 100 may employ various antenna structures such as a dipole antenna, a helical antenna, and a patch antenna, then a M-path N× end-fire linear array antenna structure is further constructed, as shown in FIG. 2, the M-path of N× end-fire linear array antennas 100 are arranged at equal intervals, the distance d between two adjacent N× end-fire linear array antennas 100 is less than λ, where λ is the wavelength, and both M and N are integers greater than 1.

The N× end-fire linear array antenna 100 comprises a linear type feed network 102, and N dipole antenna elements 101 constituting the N× end-fire array antenna. The linear type feed networks in the M paths of N× end-fire linear array antennas are connected to a M-path in-phase radio frequency signal transmitter.

By taking the Rogers4350 process-based 4×5 millimeter wave and terahertz end-fire linear array antenna as an example, the structure and fabrication process of the end-fire linear array antenna are introduced.

Figure 3:
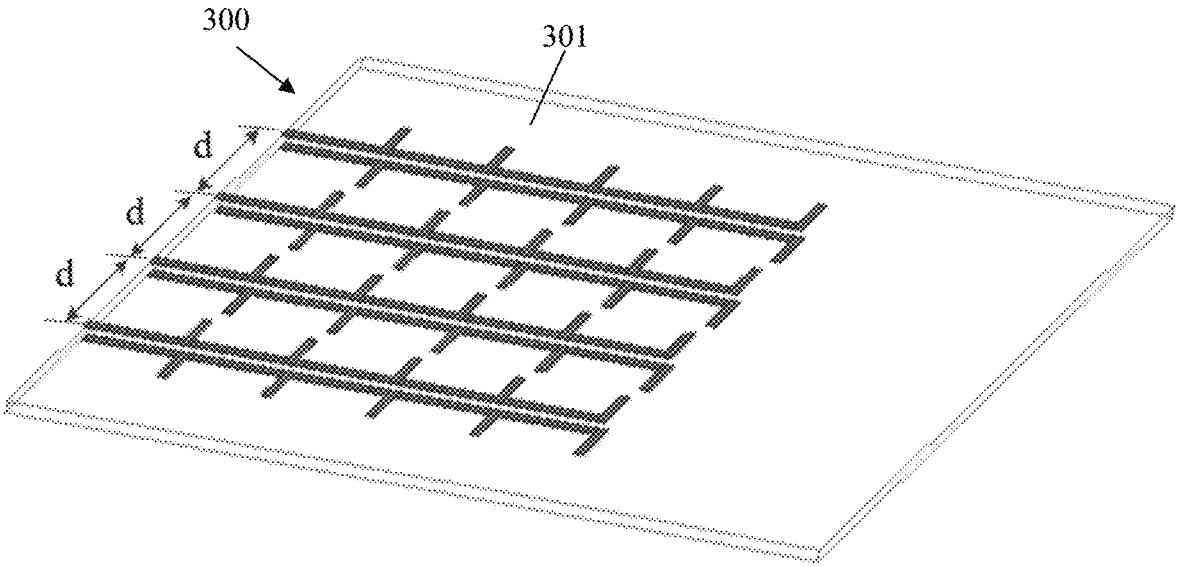
FIG. 3 is a diagram of a three-dimensional structure of a Rogers4350 process-based 4×5 millimeter wave and terahertz dipole end-fire linear array antenna constructed when the number of the array elements is that N=5.

As shown in FIG. 3, four paths of 5× end-fire linear array antennas 300 are arranged at equal intervals to form a 4×5 millimeter wave and terahertz end-fire linear array antenna, which is fabricated by using the Rogers4350 process and is directly printed on a PCB 301 with double metal surface, where a half-wave dipole element serves as the antenna element.

Figure 4:
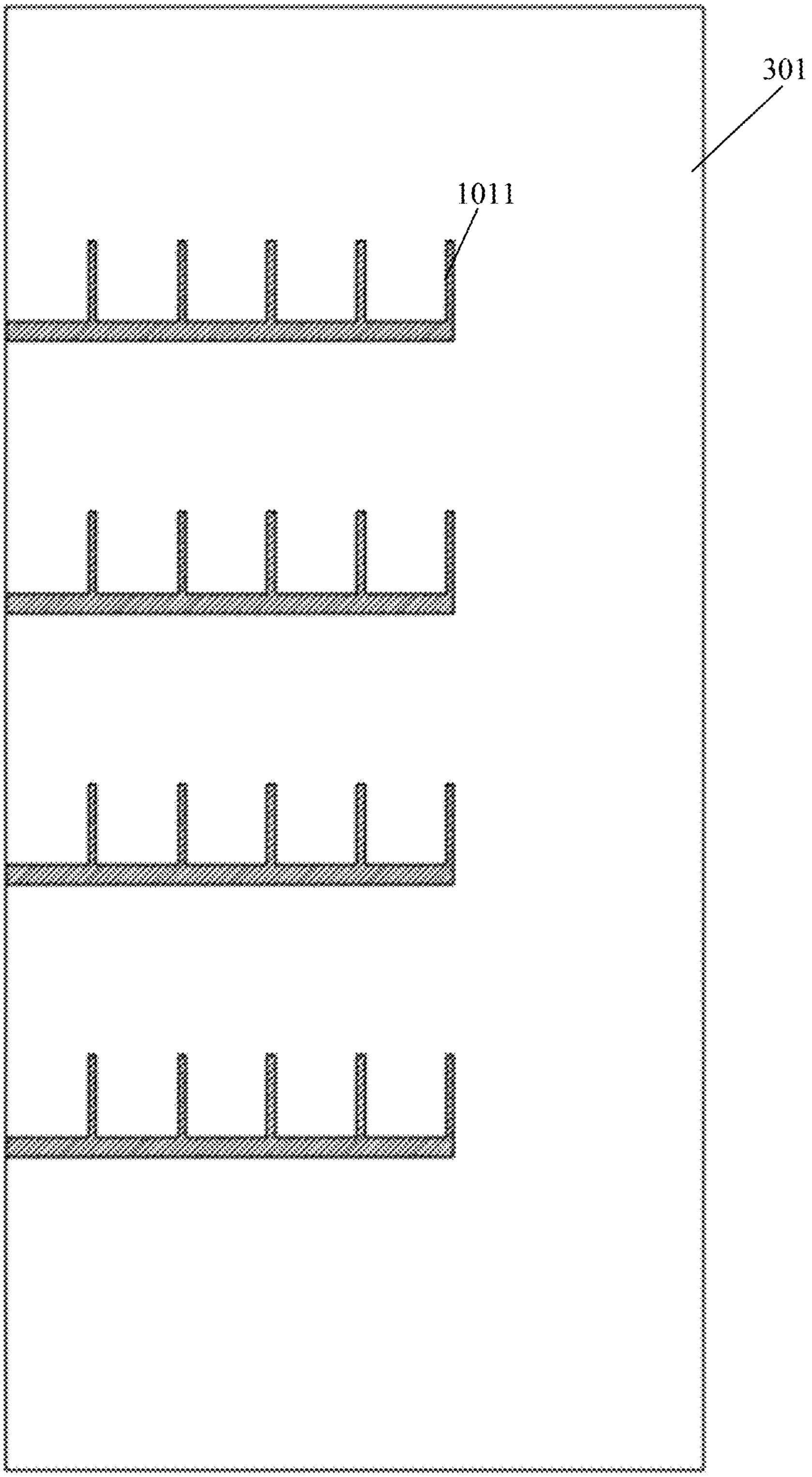
FIG. 4 is a design diagram of upper metal of a Rogers4350 process-based 4×5 millimeter wave and terahertz dipole end-fire linear array antenna constructed when the number of the array elements is that N=5 and k=2.
Figure 5:
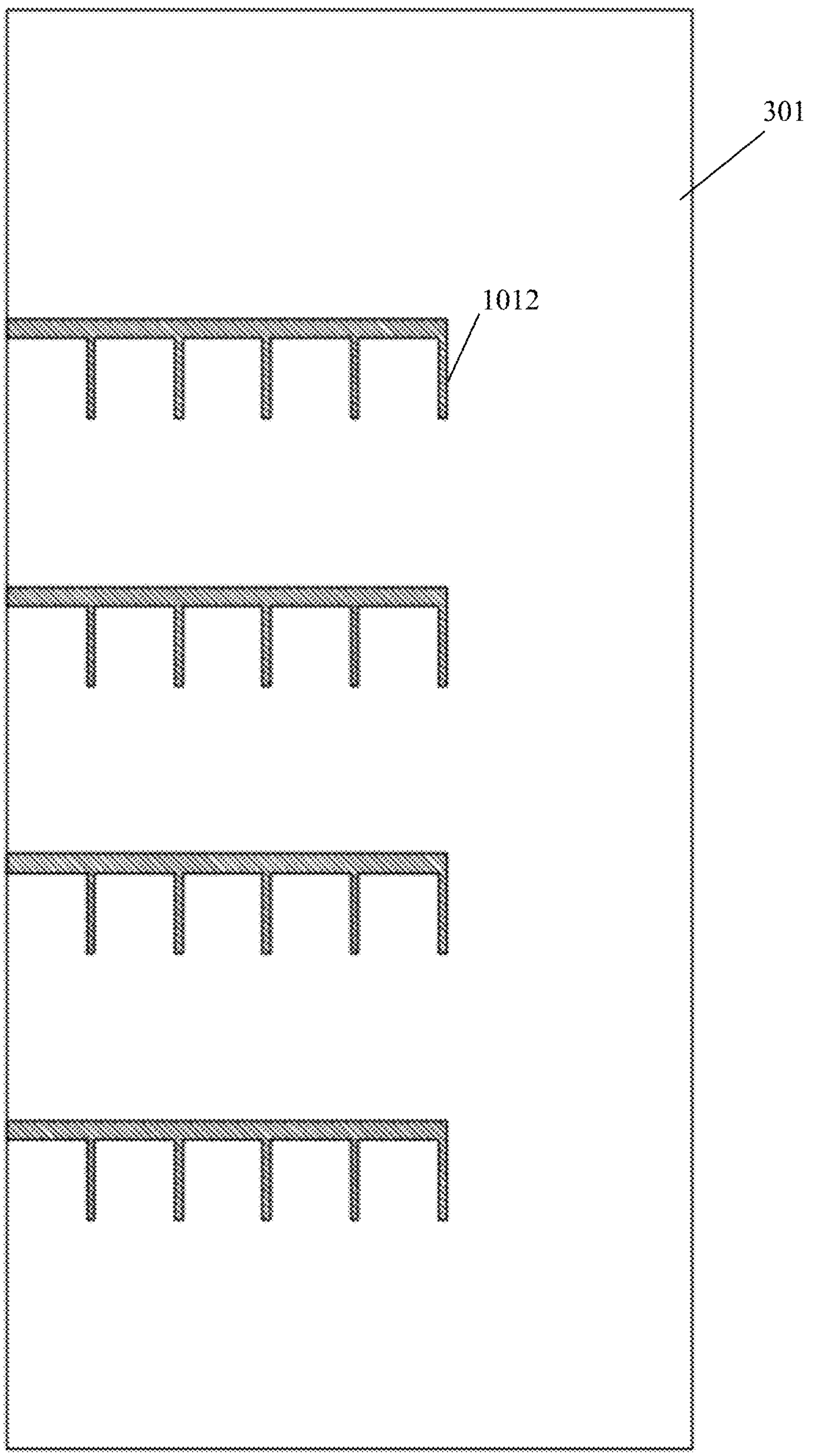
FIG. 5 is a design diagram of bottom metal of a Rogers4350 process-based 4×5 millimeter wave and terahertz dipole end-fire linear array antenna constructed when the number of the array elements is that N=5 and k=2.

As shown in FIG. 4 and FIG. 5, feed networks are etched on the upper and lower metal of the PCB board 301 with double metal surface, five antenna elements 1011 perpendicular to an upper feed network are etched on the same side of the upper feed network, and five antenna elements 1012 perpendicular to a lower feed network are etched on the same side of the lower feed network. The lower antenna elements face the opposite direction to the antenna elements on the upper feed network, and each group of upper and lower metallic antenna elements facing opposite directions form a half-wave dipole antenna element. The distance Δd between the two adjacent half-wave dipole antenna elements is equal to λ/(2k), and the distance Δd may be fine-tuned up and down from λ/(2k), and in FIG. 4, k is equal to 2.

In the embodiment, the M×N terahertz planar dipole end-fire array antenna is subjected to feed through M paths of in-phase radio frequency signals, and the M paths of in-phase radio frequency signals may be achieved by designed a M-path in-phase terahertz transmitter.

Figure 6:
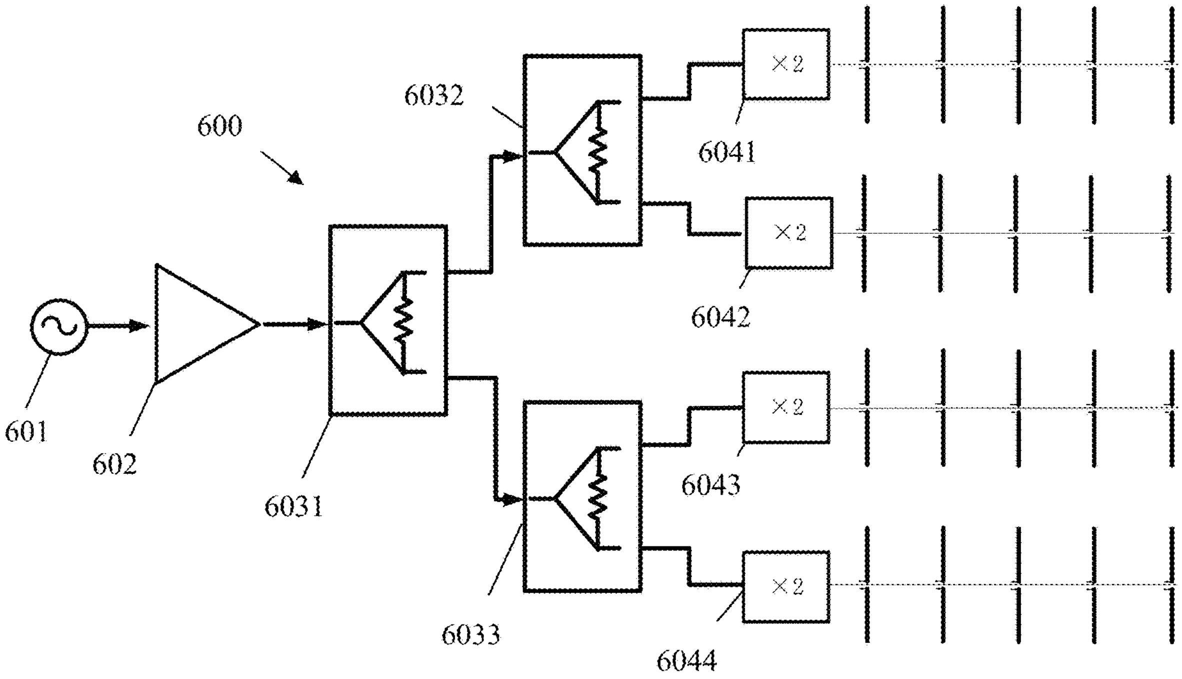
FIG. 6 is a first embodiment of a four-path in-phase radio frequency signal transmitter.

FIG. 6 provides a structure of a four-path in-phase terahertz transmitter 600. By taking an operating frequency of 244 GHz as an example, the transmitter comprises an oscillation source 601, a power amplifier 602, power dividers (6031-6033), and frequency multipliers (6041-6044). A radio frequency signal transmitted by the oscillation source is input to one power divider 6031 after passing through the power amplifier, and then is divided into two by another power divider (6032-6033); each of the two separate signals is divided into two again by a power divider. So far, one signal is divided into four paths of in-phase radio frequency signals, and the four paths of in-phase radio frequency signals are configured to feed all the N× end-fire linear array antennas respectively after passing through the frequency multipliers. In accordance with the embodiment, the frequencies of the oscillation source, the power amplifier and the power divider are all 122 GHz, and the frequency of an output signal of the frequency multiplier is 244 GHz.

Figure 7:
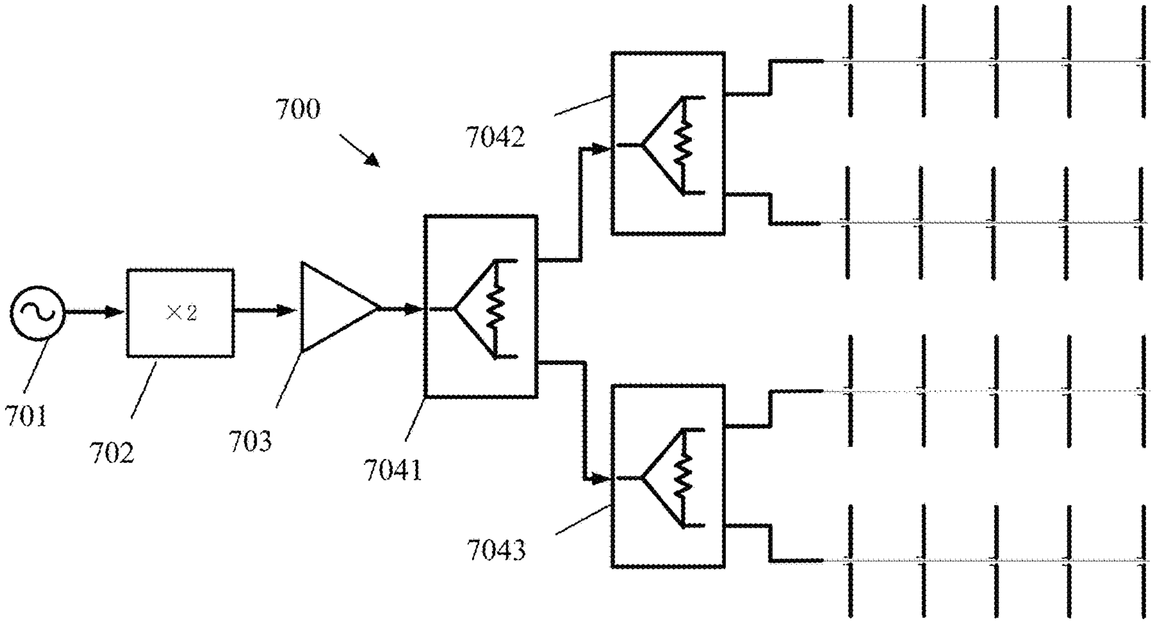
FIG. 7 is a second embodiment of a four-path in-phase radio frequency signal transmitter.

FIG. 7 provides a four-path in-phase terahertz transmitter of another structure 700. By taking an operating frequency of 244 GHz as an example, the transmitter comprises an oscillation source 701, a frequency multiplier 702, a power amplifier 703, and power dividers (7041-7043). A radio frequency signal transmitted by the oscillation source 701 is doubled in frequency by the frequency multiplier 702, and then is input to the power divider 7041 after passing through one power amplifier 703 to be divided into two; each of the two separate signals is divided into two again by another power divider (7042 or 7043). So far, one signal is divided into four paths of in-phase radio frequency signals, and the four paths of in-phase radio frequency signals are configured to directly feed all the N× end-fire linear array antennas respectively. In accordance with the embodiment, the frequency of the oscillation source is 122 GHZ, and the frequencies of an output signal of the frequency multiplier, the power amplifier and the power divider are all 244 GHz.

Those skilled in the art may also improve the above transmitter structure such that the transmitter structure can transmit multiple paths of in-phase radio frequency signals at the same time to feed the linear type feed networks in all the N× end-fire linear array antennas respectively. The feed networks are connected to the M-path in-phase terahertz transmitter through matched 50-Ohm micro-strip lines or coplanar waveguides.

By connecting the linear type feed networks of M paths of N× end-fire linear array antennas to the M-path in-phase radio frequency signal transmitter and controlling the distance between two adjacent N× end-fire linear array antennas to be less than the effective wavelength, a higher gain and a higher half-power width can be realized, and the power consumption of transmitter can be reduced. Therefore, the array antenna is suitable for a millimeter wave and terahertz transmitter array system with high energy efficiency, high output power and low power consumption requirements.

The above are only specific embodiments of the present disclosure. Apparently, the present disclosure is not limited to the above embodiments, and may has many variations. All variations that those of ordinary skill in the art may directly derive from or associate with the contents disclosed in the present disclosure shall be considered as the scope of protection of the present disclosure.

What is claimed is:

1. A M×N millimeter wave and terahertz planar dipole end-fire array antenna, comprising M paths of N× end-fire linear array antennas arranged at equal intervals, wherein a distance d between two adjacent N× end-fire linear array antennas is less than λ, wherein λ is a wavelength, and both M and N are integers greater than 1; wherein each of the N× end-fire linear array antennas is formed of a planar structure, comprising linear type feed networks, and N dipole antenna elements comprising each of the N× end-fire linear array antennas; and the linear type feed networks in the M paths of N× end-fire linear array antennas are connected to a M-path in-phase radio frequency signal transmitter;

wherein the feed networks are etched on upper and lower metal of a PCB board with double metal surfaces, antenna elements perpendicular to an upper feed network are etched on a same side of the upper feed network, and antenna elements perpendicular to a lower feed network are etched on a same side of the lower feed network; lower antenna elements face a direction opposite to the antenna elements on the upper feed network, and each group of upper and lower metallic antenna elements facing opposite directions forms a dipole antenna element.

2. The M×N millimeter wave and terahertz planar dipole end-fire array antenna according to claim 1, wherein the antenna element is a dipole antenna.

3. The M×N millimeter wave and terahertz planar dipole end-fire array antenna according to claim 1, wherein one end of the linear type feed networks is connected to the M-path in-phase radio frequency signal transmitter via matched micro-strip lines or coplanar waveguides.

4. The M×N millimeter wave and terahertz planar dipole end-fire array antenna according to claim 1, wherein a number of the antenna elements is 3 to 20, and a distance Δd between two adjacent antenna elements is equal to λ/(2k), wherein k is an integer greater than zero.

5. The M×N millimeter wave and terahertz planar dipole end-fire array antenna according to claim 4, wherein the antenna elements are etched on a same metal surface and are towards a same side.

6. The M×N millimeter wave and terahertz planar dipole end-fire array antenna according to claim 4, wherein the number of the antenna elements connected to a same upper feed network or a same lower feed network is 3 to 20, and the distance Δd between the two adjacent antenna elements is equal to λ/(2k), wherein k is an integer greater than zero.

7. The M×N millimeter wave and terahertz planar dipole end-fire array antenna according to claim 4, wherein a number M of the N× end-fire linear array antennas is 2 to 100.

* * * * *